(12) United States Patent
Gerber et al.

(10) Patent No.: US 10,688,454 B2
(45) Date of Patent: *Jun. 23, 2020

(54) SYSTEM FOR PROVIDING HOMOGENOUS POLYMER-SLUDGE COMPOSITION TO DEWATERING EQUIPMENT

(71) Applicants: Charles Bertram Gerber, Longwood, FL (US); Stephen Bertram Gerber, Longwood, FL (US)

(72) Inventors: Charles Bertram Gerber, Longwood, FL (US); Stephen Bertram Gerber, Longwood, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/677,251

(22) Filed: Nov. 7, 2019

(65) Prior Publication Data

US 2020/0070109 A1    Mar. 5, 2020

Related U.S. Application Data

(63) Continuation-in-part of application No. 15/662,549, filed on Jul. 28, 2017, now Pat. No. 10,478,755.

(60) Provisional application No. 62/414,047, filed on Oct. 28, 2016.

(51) Int. Cl.
| | |
|---|---|
| *B01F 5/04* | (2006.01) |
| *B01F 3/08* | (2006.01) |
| *B01F 15/02* | (2006.01) |
| *B01F 5/12* | (2006.01) |
| *C02F 11/123* | (2019.01) |
| *C02F 11/147* | (2019.01) |
| *C02F 1/56* | (2006.01) |

(52) U.S. Cl.
CPC ............ *B01F 5/0415* (2013.01); *B01F 3/088* (2013.01); *B01F 3/0865* (2013.01); *B01F 5/0428* (2013.01); *B01F 5/12* (2013.01); *B01F 15/0243* (2013.01); *C02F 1/56* (2013.01); *C02F 11/123* (2013.01); *C02F 11/147* (2019.01); *B01F 2215/0052* (2013.01)

(58) Field of Classification Search
None
See application file for complete search history.

(56) References Cited

U.S. PATENT DOCUMENTS

| | | |
|---|---|---|
| 4,587,023 A | 5/1986 | Srivatsa et al. |
| 4,765,745 A | 8/1988 | Strecker |
| 4,792,406 A | 12/1988 | Allenson et al. |
| 5,075,012 A | 12/1991 | Busse |
| 5,366,622 A | 11/1994 | Geyer |
| 2001/0020603 A1 | 9/2001 | Moorehead et al. |
| 2001/0042721 A1 | 11/2001 | Hodges et al. |

(Continued)

*Primary Examiner* — Clare M Perrin
(74) *Attorney, Agent, or Firm* — Jason T. Daniel, Esq.; Daniel Law Offices, P.A.

(57) ABSTRACT

An improved system for providing a homogeneous polymer-sludge composition to dewatering equipment includes an input mechanism that is adapted to receive sludge from a first supply source, and polymer materials from a second supply source. The input mechanism functioning to perform an initial blending of the materials before discharging the same to a pump unit. The pump unit comprising a boundary layer viscous drag pump that functions to efficiently and simultaneously mix and pump the polymer/sludge material to dewatering equipment in a manner that does not shear the polymer or reduce the efficiency, as previously experienced with downstream mixing units.

17 Claims, 5 Drawing Sheets

(56) References Cited

U.S. PATENT DOCUMENTS

2006/0006114 A1    1/2006   Deskins
2018/0117500 A1    5/2018   Gerber et al.

SYSTEM FOR PROVIDING HOMOGENOUS POLYMER-SLUDGE COMPOSITION TO DEWATERING EQUIPMENT

CROSS-REFERENCE TO RELATED APPLICATIONS

This application is a Continuation-In-Part to and claims the benefit of U.S. patent application Ser. No. 15/662,549 which claims the benefit of U.S. Application Ser. No. 62/414,047 filed on Oct. 28, 2016, the contents of each of which are incorporated herein by reference.

TECHNICAL FIELD

The present invention relates generally to waste water treatment and/or solids dewatering from other processes, and more particularly to an improved system for providing homogeneous polymer-sludge composition to dewatering equipment.

BACKGROUND

The statements in this section merely provide background information related to the present disclosure and may not constitute prior art.

Sludge dewatering is a process whereby the liquid and solid portions of sewage and other forms of wastewater are separated. As shown in background FIG. 1, the process for dewatering sludge typically includes four core components, 1) a holding tank, 2) a high-pressure transfer pump, 3) a shear mixer, and 4) dewatering equipment.

The holding tank 1 functions to receive sludge, which is partially treated sewage that contains both solid particles and liquid particles. The size of the tank depends on the volume of material to which the treatment facility processes, and the tank can be made from any number of different materials.

The high-pressure transfer pump 2 functions to receive sludge from the holding tank 1, and discharge the same under pressure downstream to a turbulent mixing valve and then to the dewatering equipment. The most commonly utilized pump for wastewater treatment is a positive displacement pump that typically operates at a pressure of 30-40 psi discharge pressure. One suitable example of a commercially available unit includes a positive displacement progressive cavity pump manufactured by Moyno, Netzsch, and others, for example.

In order to prevent small particles of sludge from passing through the liquid side of the dewatering equipment, polymers are typically added to the sludge to bind the waste particles together. This polymer injection process is performed on the discharge side of the pump and is typically accomplished through the use of a high shear mixing pattern wherein violent agitation of the polymer and slurry occur in the shortest time possible.

In order to operate at peak capacity, shear mixers typically require the above noted 30 psi, to thoroughly mix the materials, and thus create an output of approximately 80-600 gallons per minute of sheared mixed polymer/sludge material that is then fed to the dewatering equipment.

The dewatering equipment functions to receive the sheared mixed polymer/sludge material and separate the solids from the liquids. One of the most commonly utilized types of dewatering equipment includes a filter press system that utilizes pressure and porous membrane belts filters to perform the separation process. One suitable example of a commercially available unit includes the Belt Filter Press from Ashbrook Simon-Hartley, Inc., for example.

Although this process has been utilized for many years, there are several inefficiencies in layout and implementation of such systems. For example, the use of a downstream mixer to break up/shear the sludge so that it can be mixed with the polymer is counterproductive to the process performed by the dewatering equipment, as this requires the dewatering equipment to attempt to reconnect/compact the solid sludge particles back together when performing the separation process.

Moreover, by mixing the polymer with the sludge and then shearing the composition, the mixer functions to break up the long chain molecules of the polymer, thus requiring a relatively large amount of polymer to be used.

Finally, the energy utilized by the high shear mixer requires the pump to work significantly harder in terms of power and pressure to supply the material to the dewatering equipment, as noted above.

Accordingly, through extensive research and development, the inventors of the present invention have created an improved system for providing a homogeneous polymer-sludge composition to dewatering equipment, that reduces the overall number of components, and reduces material and energy costs. The manner by which will become more apparent in the description which follows, particularly when read in conjunction with the accompanying drawings.

SUMMARY OF THE INVENTION

The present invention is directed to an improved system for providing a homogeneous polymer-sludge composition to dewatering equipment.

One embodiment of the present invention can include an input mechanism that is adapted for receiving sludge and polymer materials. The input mechanism can perform an initial blending of the materials and can discharge the same to a pump unit.

One embodiment of the present invention can include a boundary layer viscous drag pump which can function to efficiently and simultaneously mix and pump the polymer/sludge material to dewatering equipment in a manner that does not shear the polymer or reduce the efficiency, as previously experienced with downstream mixing units.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
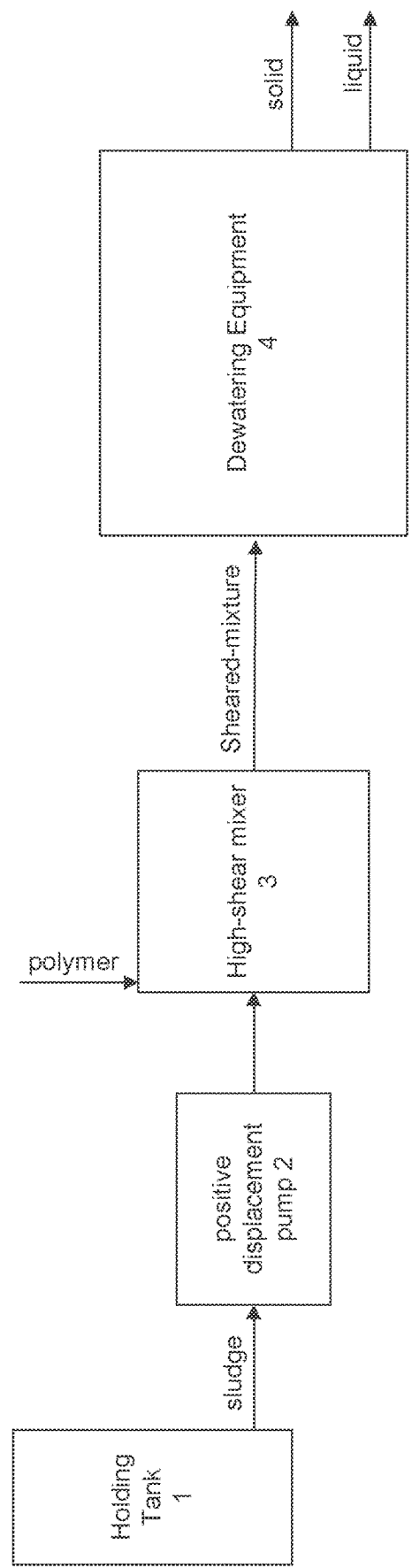
FIG. 1 is a simplistic block diagram of a wastewater dewatering process, in accordance with background art.
Figure 2:
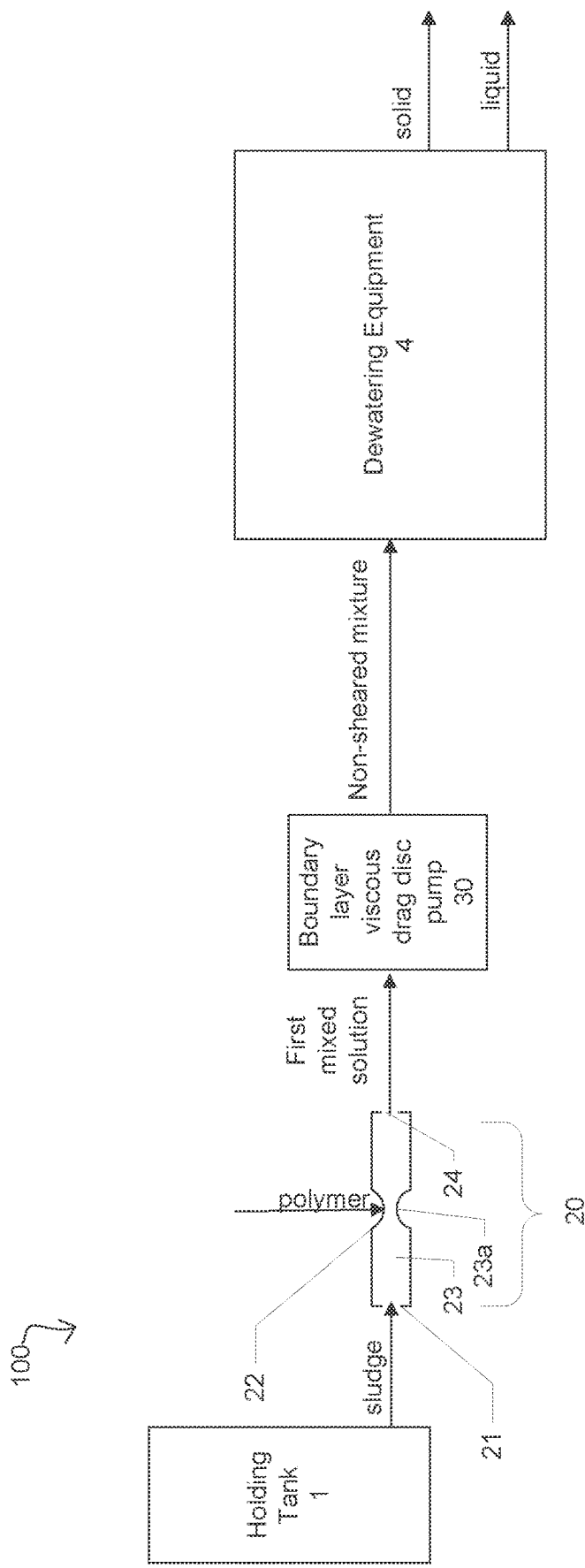
FIG. 2 is a simplistic block diagram of a wastewater dewatering process, in accordance with one embodiment of the present invention.

FIG. 2 illustrate one embodiment of an improved system and method for providing homogeneous polymer-sludge composition to dewatering equipment in wastewater treatment facilities 100 that are useful for understanding the inventive concepts disclosed herein. In each of the drawings, identical reference numerals are used for like elements of the invention or elements of like function. As shown, the system 100 can include, essentially, a holding tank 1, a mixing unit 20 and a pumping unit 30 that are in communication with dewatering equipment 4.

In one embodiment, the mixing unit 20 can include, comprise or consist of a first input member 21 for receiving sludge from a holding tank or other supply source, and a second input member 22 for receiving a polymer material from another tank or supply source. The mixing unit 20 can also include a central channel 23 wherein the materials from the first and second input members can be combined, and the resulting first mixed solution can be discharged by an output member 24 to the below described pumping unit 30 either directly or via one or more supply lines/pipes.

In one embodiment, the mixing unit 20 can include or comprise a venturi valve having a central channel 23 with a generally hourglass shape that creates a venturi effect wherein the constricted portion 23a functions to increase the velocity of the materials passing therethrough. The constricted portion also functions to disturb the flow of the material, so as to perform a first mixing step of the materials received from the first and second input members, before outputting the same at an increased velocity.

Owing to the intended use and operation of the mixing unit 20, it is preferred that the same be constructed from a sturdy material such as steel, for example, that is suitable for use with liquids under pressure. Of course, any number of other shapes, sizes and construction materials are also contemplated.

Figure 3:
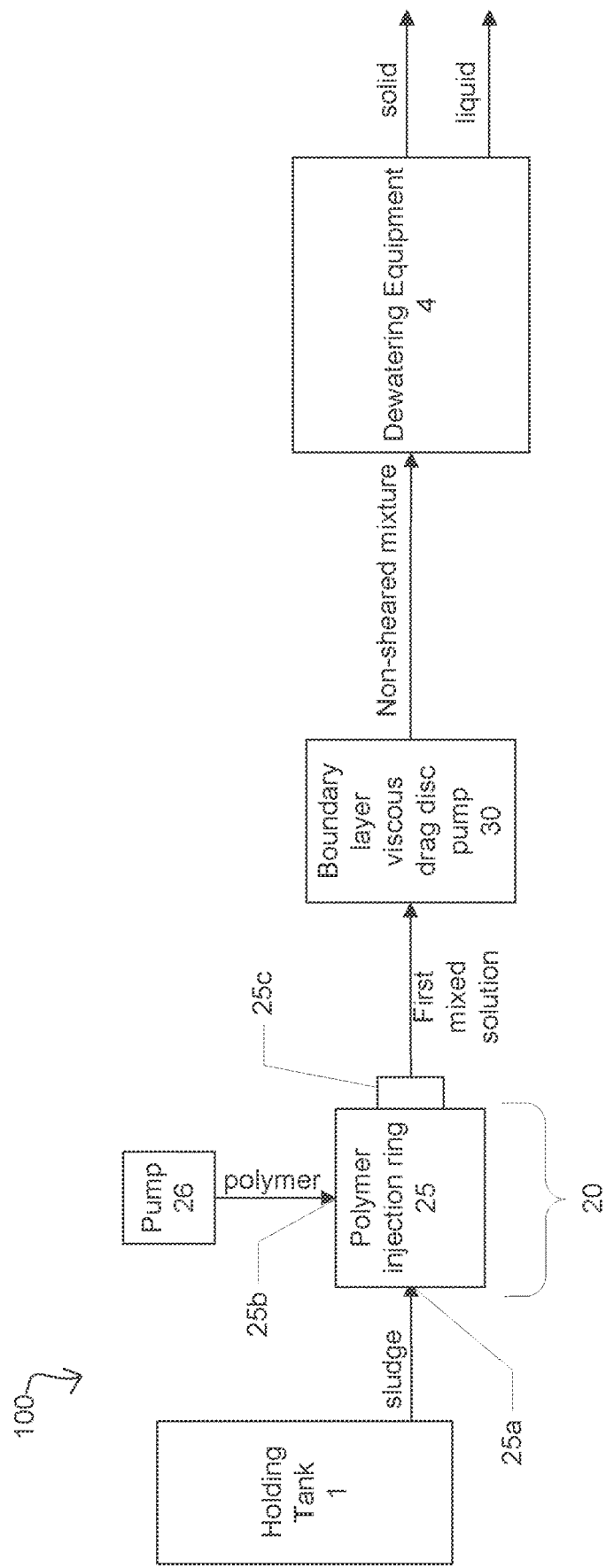
FIG. 3 is another simplistic block diagram of a wastewater dewatering process, in accordance with one embodiment of the present invention.

Although described above as including a venturi valve, other devices capable of receiving the polymer and sludge materials and performing the first mixing step are also contemplated. For example, FIG. 3, illustrates one embodiment of the system 100, wherein the mixing unit 20 can include, comprise or consist of a polymer injection ring 25 or similar device, having a first input member 25a for receiving sludge from a holding tank or other supply source, a second input member 25b for receiving a polymer material, and an output member 25c for discharging material to the below described pumping unit 30 either directly or via one or more supply lines/pipes.

In one embodiment, a polymer feed pump 26 may be provided to pump the polymer to the mixing unit 20. Such a feature advantageously allows a system operator to monitor and/or regulate the amount and flow of polymer through the system. In operation, the injection ring can function to simultaneously receive the separate sludge and polymer materials, before outputting the same to the pump. In this regard, the sludge and polymer materials undergo a first mixing step prior to being introduced into the pump.

Although described above as utilizing specific components to perform the first mixing step, the inventive concepts are not to be construed as limiting to such components. In this regard, any number or type of different components that are capable of mixing, blending or otherwise introducing polymer and sludge together upstream from the pump are also contemplated. Such components can be directly connected to the input of the pump or can be located a discrete distance from the pump and connected via a pipe, for example. In operation, the inventors have discovered that placement of the first mixing device between 0 and 30 feet from the input of the pump provides the greatest efficiency; however other distances are also contemplated.

In either instance, the pumping unit 30 can preferably include, comprise or consist of a pump that operates on the principles of boundary layer and viscous drag, such as a Tesla Pump, a Disc Pump, or a boundary layer viscous drag disc pump, for example. As will be known to those of skill in the art, such pumps include an internal disc that creates a powerful force for pulling/sucking a product through the pump in a smooth, gentle, non-impingement and pulsation-free flow. Moreover, the boundary layer viscous drag pumping principle of the pump during this pulling procedure functions to perform a second mixing procedure that thoroughly blends the sludge and polymer materials together, so as to create a homogeneous output that can be distributed directly to the dewatering equipment.

One nonlimiting example of a commercially available pump that can be utilized with the above described system includes the model 403-12-2HHD Disc Pump that is commercially available from DiscFlo®, for example.

By performing a first mixing procedure upstream from the pump, and then using a boundary layer viscous drag pump to perform a second mixing procedure, the inventive system advantageously eliminates the need for a separate mixer machine to be located between the pump and dewatering equipment. Moreover, because the material exiting the pump is not sheared, less polymer is needed to produce the homogeneous blend, thereby allowing the mixture to be pumped at lower pressures, typically 5-15 psi, directly to the dewatering equipment 4. Such features result in a tremendous savings in terms of raw material (e.g., polymer), cost of machinery (e.g., absence of the mixer), and power consumption.

Figure 4:
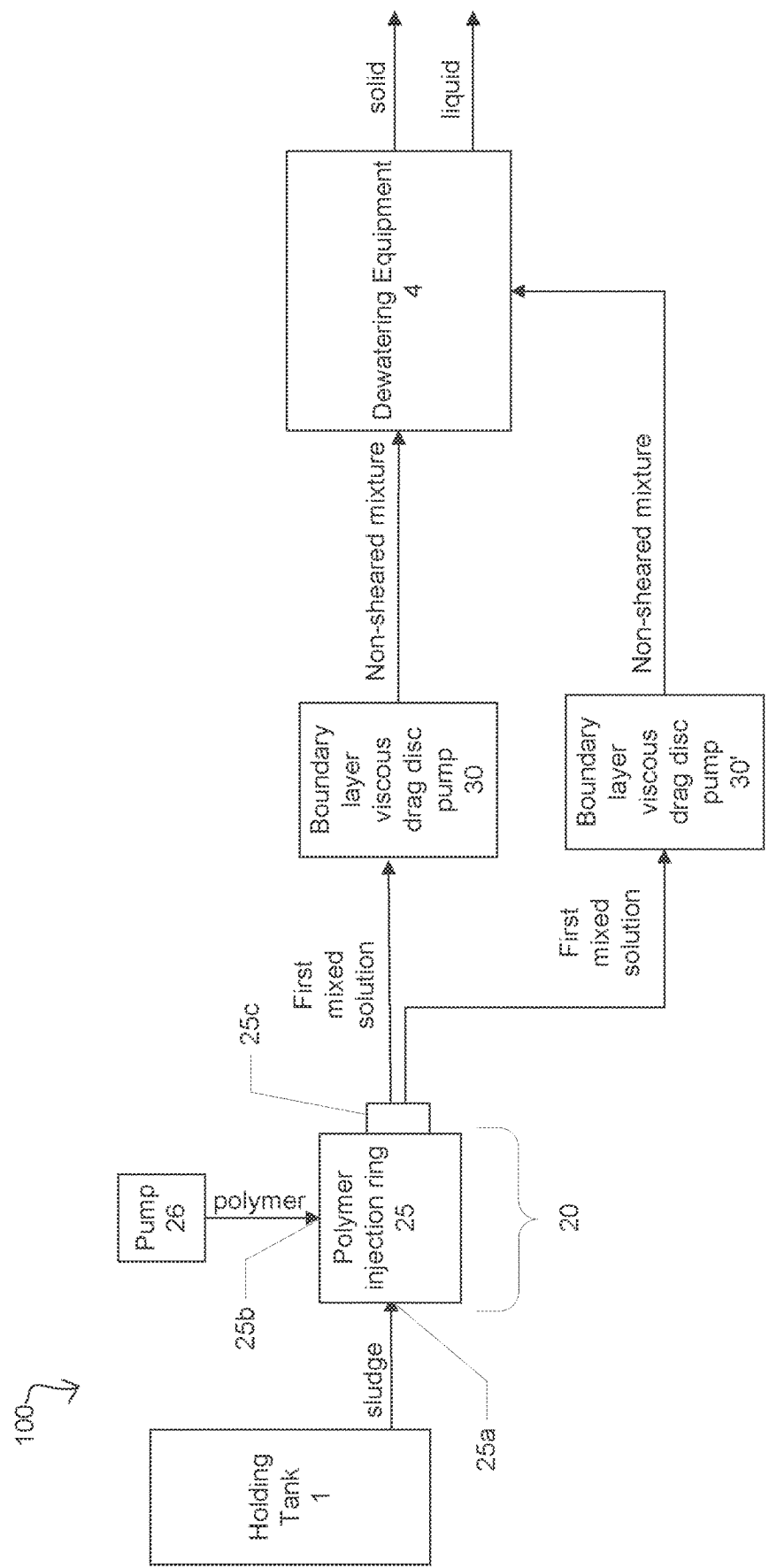
FIG. 4 is another simplistic block diagram of a wastewater dewatering process, in accordance with one embodiment of the present invention.
Figure 5:
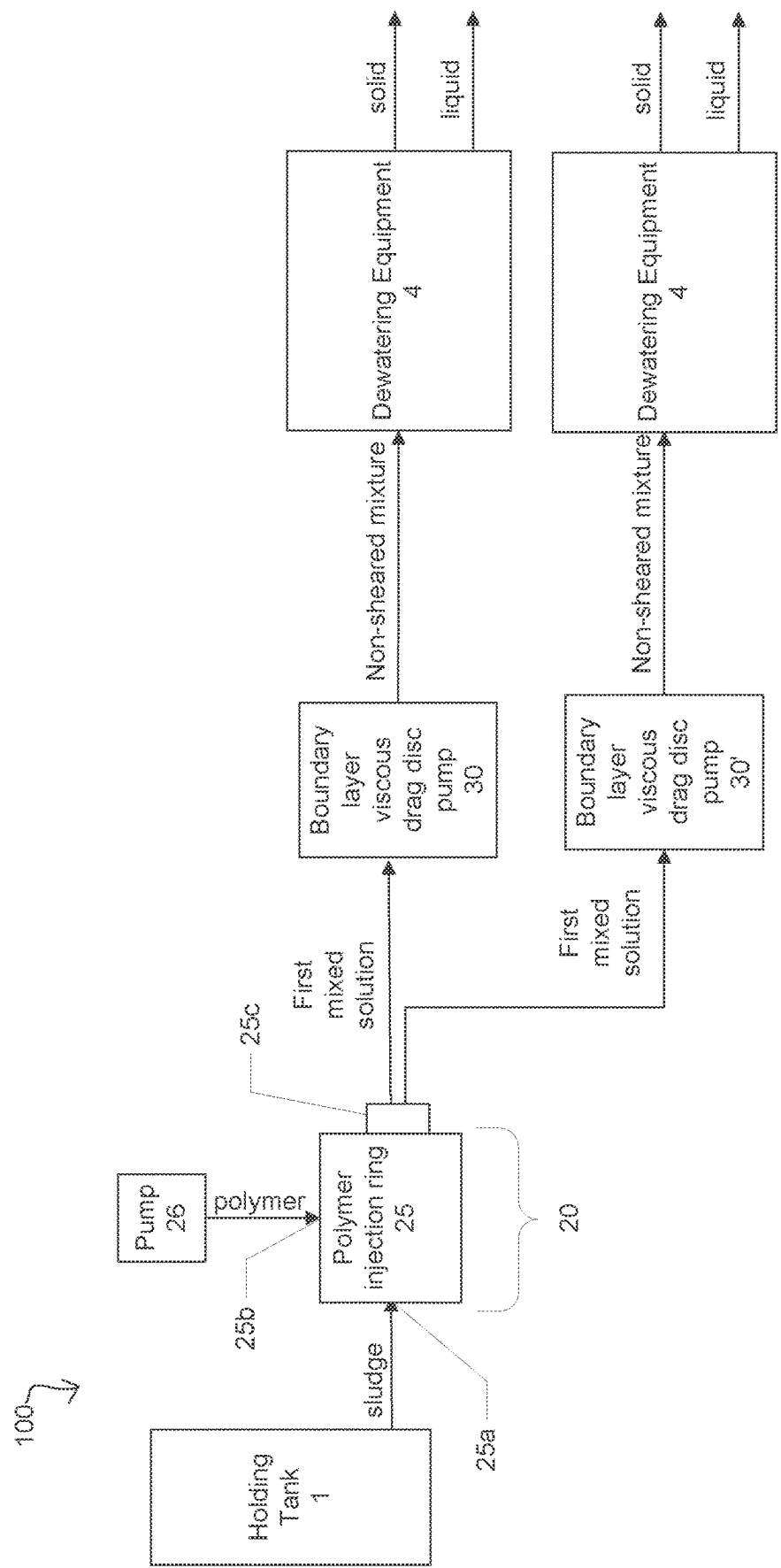
FIG. 5 is another simplistic block diagram of a wastewater dewatering process, in accordance with one embodiment of the present invention.

Although described above as having a mixing unit that is in fluid communication with a single pump, other configurations are also contemplated. To this end, FIGS. 4 and 5 illustrate one embodiment wherein the mixing unit is located upstream from two or more pumping units and is sized so as to supply the first mixed solutions to each individual pump 30 and 30'. As shown, the output from each pump can be directed to one or more pieces of dewatering equipment located downstream. Such a configuration being applicable for larger dewatering systems and further reduces costs and expenses as compared to traditional systems through the elimination of duplicate components.

As described herein, one or more elements of the system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for providing a homogeneous polymer-sludge composition to dewatering equipment, said system comprising:
   a mixing unit having a first input member for receiving sludge, a second input member for receiving polymer, and an output member for discharging a first mixed solution; and
   a boundary layer viscous drag disc pump that is in fluid communication with the output member of the mixing unit, said viscous drag disc pump being configured to pull the first mixed solution from the output member, to perform a second mixing procedure on the first mixed solution, and to supply a second mixed solution to a piece of dewatering equipment.

2. The system of claim 1, wherein the output member of the mixing unit is directly coupled to an input of the viscous drag disc pump.

3. The system of claim 1, wherein the output member of the mixing unit is positioned a discrete distance from an input of the viscous drag disc pump.

4. The system of claim 1, wherein the mixing unit includes a central channel for performing a first mixing procedure.

5. The system of claim 4, wherein the central channel comprises a polymer injection ring.

6. The system of claim 5, further comprising:
   a pump for introducing the polymer to the second input member.

7. The system of claim 4, wherein the central channel comprises an hourglass shape that functions to create a venturi effect on the sludge and polymer.

8. The system of claim 7, wherein the mixing unit is constructed from steel.

9. The system of claim 1, further comprising a holding tank that is in communication with the first input member, said holding tank being configured to store the sludge.

10. The system of claim 1, wherein the piece of dewatering equipment is in direct and uninterrupted fluid communication with the output of the boundary layer viscous drag disc pump.

11. The system of claim 10, wherein the piece of dewatering equipment comprises a belt filter press.

12. The system of claim 1, further comprising:
   a second boundary layer viscous drag disc pump that is also in fluid communication with the output member of the mixing unit, said second boundary layer viscous drag disc pump being configured to pull a portion of the first mixed solution from the output member, to perform a second mixing procedure on the received portion of the first mixed solution, and to supply another second mixed solution to the piece of dewatering equipment.

13. The system of claim 1, further comprising:
   a second boundary layer viscous drag disc pump that is also in fluid communication with the output member of the mixing unit, said second boundary layer viscous drag disc pump being configured to pull a portion of the first mixed solution from the output member, to perform a second mixing procedure on the received portion of the first mixed solution, and to supply another second mixed solution to a second piece of dewatering equipment.

14. A method for providing a homogeneous polymer-sludge composition to dewatering equipment, said method comprising:
   providing sludge to a first input member of a mixing unit;
   providing polymer to a second input member of a mixing unit;
   performing a first mixing procedure at the mixing unit to create a first mixed solution;
   introducing the first mixed solution to an input of at least one boundary layer viscous drag pump;
   performing a second mixing procedure at the at least one boundary layer viscous drag pump; and
   pumping a second mixed solution from each of the at least one boundary layer viscous drag pump to one or more pieces of dewatering equipment.

15. The method of claim 14, wherein the pumping step is performed at a pressure of between 5 to 15 psi.

16. The method of claim 14, wherein the second mixed solution comprises:
   a homogeneous polymer-sludge composition.

17. The system of claim 13, wherein the second mixed solution comprises:
   a non-sheared homogeneous polymer-sludge composition.

* * * * *